United States Patent
Park et al.

(10) Patent No.: US 9,219,914 B2
(45) Date of Patent: Dec. 22, 2015

(54) METHOD AND AN APPARATUS FOR DECODING A VIDEO SIGNAL

(71) Applicant: LG Electronics Inc., Seoul (KR)

(72) Inventors: Seung Wook Park, Seoul (KR); Jung Sun Kim, Seoul (KR); Young Hee Choi, Seoul (KR); Byeong Moon Jeon, Seoul (KR); Joon Young Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/205,591

(22) Filed: Mar. 12, 2014

(65) Prior Publication Data

US 2014/0192889 A1 Jul. 10, 2014

Related U.S. Application Data

(63) Continuation of application No. 12/574,415, filed on Oct. 6, 2009, now Pat. No. 8,699,562.

(60) Provisional application No. 61/103,221, filed on Oct. 6, 2008, provisional application No. 61/119,697, filed (Continued)

(30) Foreign Application Priority Data

Oct. 6, 2009 (KR) .................. 10-2009-0094486

(51) Int. Cl.
*H04N 7/12* (2006.01)
*H04N 19/51* (2014.01)
(Continued)

(52) U.S. Cl.
CPC ....... *H04N 19/00684* (2013.01); *H04N 19/132* (2014.11); *H04N 19/176* (2014.11);
(Continued)

(58) Field of Classification Search
USPC ........................... 375/240.01, 240.16
See application file for complete search history.

(56) References Cited

U.S. PATENT DOCUMENTS 5,751,364 A 5/1998 Yasuda
7,599,438 B2 10/2009 Holcomb et al.
(Continued)

FOREIGN PATENT DOCUMENTS

CN 1649414 A 8/2005
JP 2007-516640 A 6/2007
(Continued)

OTHER PUBLICATIONS

PCT International Search Report dated Jun. 1, 2010 for Application No. PCT/KR2009/005697, 3 pages.
(Continued)

*Primary Examiner* — Tracy Li
(74) *Attorney, Agent, or Firm* — Fish & Richardson P.C.

(57) ABSTRACT

A method of processing a video signal is disclosed. The present invention includes obtaining a current macroblock type, obtaining skip or direct mode indication information on a partition of the current macroblock according to the current macroblock type, deriving a motion vector of the partition according to the skip or direct mode indication information, and predicting a pixel value of the partition using the motion vector. Accordingly, the present invention obtains a pixel value of a reference block close to an original video using a motion vector, thereby enhancing a reconstruction ratio of the macroblock. As a macroblock uses skip or direct prediction indication information, it is unnecessary to separately code skip mode indication information and direct mode indication information on the macroblock, whereby an information size to be coded can be reduced.

5 Claims, 10 Drawing Sheets

Related U.S. Application Data on Dec. 3, 2008, provisional application No. 61/120,060, filed on Dec. 5, 2008, provisional application No. 61/143,813, filed on Jan. 11, 2009, provisional application No. 61/154,420, filed on Feb. 22, 2009, provisional application No. 61/159,058, filed on Mar. 10, 2009.

(51) Int. Cl.

| | | |
|---|---|---|
| *H04N 19/176* | (2014.01) | |
| *H04N 19/70* | (2014.01) | |
| *H04N 19/46* | (2014.01) | |
| *H04N 19/513* | (2014.01) | |
| *H04N 19/61* | (2014.01) | |
| *H04N 19/132* | (2014.01) | |
| *H04N 19/44* | (2014.01) | |
| *H04N 19/573* | (2014.01) | |

(52) U.S. Cl.
CPC ............. *H04N 19/44* (2014.11); *H04N 19/46* (2014.11); *H04N 19/513* (2014.11); *H04N 19/573* (2014.11); *H04N 19/61* (2014.11); *H04N 19/70* (2014.11)

(56) References Cited

U.S. PATENT DOCUMENTS

| | | | |
|---|---|---|---|
| 2001/0031004 A1* | 10/2001 | Kim et al. | 375/240.16 |
| 2004/0234143 A1 | 11/2004 | Hagai | |
| 2005/0053143 A1 | 3/2005 | Holcomb | |
| 2005/0190844 A1* | 9/2005 | Kadono et al. | 375/240.16 |
| 2007/0019730 A1 | 1/2007 | Lee | |
| 2007/0230575 A1 | 10/2007 | Han | |
| 2007/0274396 A1 | 11/2007 | Zhang | |
| 2008/0075171 A1 | 3/2008 | Suzuki | |
| 2008/0240248 A1 | 10/2008 | Lee | |
| 2010/0080296 A1* | 4/2010 | Lee et al. | 375/240.16 |
| 2011/0044550 A1 | 2/2011 | Tian | |

FOREIGN PATENT DOCUMENTS

| | | |
|---|---|---|
| WO | WO 2005/027496 A2 | 3/2005 |
| WO | WO 2008/027192 A2 | 3/2008 |
| WO | WO 2009/131688 A3 | 1/2010 |
| WO | WO 2010/039733 A2 | 4/2010 |

OTHER PUBLICATIONS

Siwei Ma et al., "High-definition Video Coding with Super-macroblocks (Invited Paper)", Visual Communications and Image Processing, Ming-Hsieh Department of Electrical Engineering and Integrated Media Systems Center, University of Southern California, Los Angeles, CA, USA, 12 pages.

Thomas Wiegand et al., "Overview of the H.264/AVC Video Coding Standard", IEEE Transactions on Circuits and Systems for Video Technology, IEEE Service Center, Piscataway, NJ, US LNKD-DOI:10.1109/TCSVT.2003.815165, vol. 13, No. 7, Jul. 1, 2003, 18 pages.

European Search Report for Application No. EP09012634.3-2223 dated Jun. 10, 2010, 8 pages.

European Office Action dated Apr. 11, 2011 for Application No. 09012634, 6 pages.

Jungyoup Yang et al.; "Motion Vector Coding with Optimal Predictor", Jan. 29, 2009, XP030044806, 7 pages.

Joel Jung et al.; "Competition-Based Scheme for Motion Vector Selection and Coding", No. VCEG-AC06, Aug. 2, 2006, XP030003490, 7 pages.

Qualcomm Inc; "Video Coding Using Extended Block Sizes", ITU Study Group 16, vol. COM16C123E, Jan. 1, 2009, XP007912516, 4 pages.

European Search Report dated Apr. 12, 2012, for Application No. 09825015, 8 pages.

Naito S. et al.: "Results of Core Experiment 6 on Multiview Video Coding", JVT Meeting; 80. MPEG Meeting; Apr. 21, 2007-Apr. 27, 2007; San Josa Cr, US; (Joint Video Team of ISO/IEC JTC1/SC29/WG11 and ITU-T SG. 16), No. JVT-WO96, Apr. 23, 2007, XP030007056, ISSN:0000-0153, 7 pages.

Gang Zhu et al.: "Inter-View Skip Mode for FTV with Depth Information", 83. MPEG Meeting; Jan. 14, 2008-Jan. 18, 2008; Antalya; (Motion Picture Expert Group or ISO/IEC JTC1/SC29/WG11), No. M15098, Jan. 9, 2008, XP030043695, 6 pages.

Gang Zhu et al.: "Inter-view Skip Mode with Depth Information", 26. JVT Meeting; 83. MPEG Meeting; Jan. 13, 2008-Jan. 18, 2008; Antalya, (Joint Video Team of ISO/IEC JTC1/SC29/WG11 and ITU-T SG.16), No. JVT-Z029, Jan. 15, 2008, XP030007318, ISSN:0000-0136, 9 pages.

Masayuki Tanimoto et al.: "Depth Estimation using Stereo Camera Rectification for Non=parallel Camera Setup", 84. mpeg meeting;Apr. 28, 2008-May 2, 2008; Archamps; (Motion Picture Expert Group or ISO/IEC JTC1/ SC29/WG11), No. M15380, Apr. 25 20008 (Apr. 25, 2008), xp030043977.

European Office Action dated Oct. 29, 2013 for Application No. 09825015. 6 pages.

Chinese Office Action dated Mar. 17, 2014 for Application No. 2009-80144468, with English Translation, 13 pages.

* cited by examiner

FIG. 4

```
sub_mb_pred( mb_type ) {
  for( mbPartIdx = 0; mbPartIdx < 4; mbPartIdx++ ) {
S400 ── sub_mb_skip_flag[ mbPartIdx ]
        if(sub_mb_skip_flag[mb_PartIdx] == 0)
S410 ── sub_mb_type[ mbPartIdx ]
  }
  for( mbPartIdx = 0; mbPartIdx < 4; mbPartIdx++ )
    if( ( num_ref_idx_l0_active_minus1 > 0 || mb_field_decoding_flag ) &&
        mb_type != P_8x8ref0 &&
        sub_mb_type[ mbPartIdx ] != B_Direct_8x8 &&
        SubMbPredMode( sub_mb_type[ mbPartIdx ] ) != Pred_L1
        && sub_mb_skip_flag[mb_PartIdx] == 0)
S420 ──  ref_idx_l0[ mbPartIdx ]
  for( mbPartIdx = 0; mbPartIdx < 4; mbPartIdx++ )
    if( (num_ref_idx_l1_active_minus1 > 0 || mb_field_decoding_flag ) &&
        sub_mb_type[ mbPartIdx ] != B_Direct_8x8 &&
        SubMbPredMode( sub_mb_type[ mbPartIdx ] ) != Pred_L0
        && sub_mb_skip_flag[mb_PartIdx] == 0)
S420 ──  ref_idx_l1[ mbPartIdx ]
  for( mbPartIdx = 0; mbPartIdx < 4; mbPartIdx++ )
    if( sub_mb_type[ mbPartIdx ] != B_Direct_8x8 &&
        SubMbPredMode( sub_mb_type[ mbPartIdx ] ) != Pred_L1
        && sub_mb_skip_flag[mb_PartIdx] == 0)
      for( subMbPartIdx = 0;
           subMbPartIdx < NumSubMbPart( sub_mb_type[ mbPartIdx ] );
           subMbPartIdx++)
        for( compIdx = 0; compIdx < 2; compIdx++ )
S420 ──    mvd_l0[ mbPartIdx ][ subMbPartIdx ][ compIdx ]
  for( mbPartIdx = 0; mbPartIdx < 4; mbPartIdx++ )
    if( sub_mb_type[ mbPartIdx ] != B_Direct_8x8 &&
        SubMbPredMode( sub_mb_type[ mbPartIdx ] ) != Pred_L0
        && sub_mb_skip_flag[mb_PartIdx] == 0)
      for( subMbPartIdx = 0;
           subMbPartIdx < NumSubMbPart( sub_mb_type[ mbPartIdx ] );
           subMbPartIdx++)
        for( compIdx = 0; compIdx < 2; compIdx++ )
S420 ──    mvd_l1[ mbPartIdx ][ subMbPartIdx ][ compIdx ]
}
```

FIG. 7

| | | |
|---|---|---|
| | 0 | B_Skip_0_1_2 |
| | 1 | B_Skip_0_1_3 |
| | 2 | B_Skip_0_2_3 |
| | 3 | B_Skip_1_2_3 |
| | 4 | B_Skip_0_1 |
| S600 — | 5 | B_Skip_0_2 |
| | 6 | B_Skip_0_3 |
| | 7 | B_Skip_1_2 |
| | 8 | B_Skip_1_3 |
| | 9 | B_Skip_2_3 |
| | 10 | B_Skip_0 |
| | 11 | B_Skip_1 |
| | 12 | B_Skip_2 |
| | 13 | B_Skip_3 |
| | 14 | B_Direct_all |
| | 15 | B_Direct_0_1_2 |
| | 16 | B_Direct_0_1_3 |
| | 17 | B_Direct_0_2_3 |
| | 18 | B_Direct_1_2_3 |
| | 19 | B_Direct_0_1 |
| | 20 | B_Direct_0_2 |
| | 21 | B_Direct_0_3 |
| | 22 | B_Direct_1_2 |
| | 23 | B_Direct_1_3 |
| | 24 | B_Direct_2_3 |
| | 25 | B_Direct_0 |
| | 26 | B_Direct_1 |
| | 27 | B_Direct_2 |
| | 28 | B_Direct_3 |
| | 29 | B_L0_32x32 |
| | ... | ... |
| | inferred | B_Skip_all |

METHOD AND AN APPARATUS FOR DECODING A VIDEO SIGNAL

CROSS-REFERENCE TO RELATED APPLICATION

This application is a continuation of U.S. application Ser. No. 12/574,415, filed Oct. 6, 2009, now allowed, which claims the benefit of U.S. Provisional Application No. 61/103,221 filed on Oct. 6, 2008, U.S. Provisional Application No. 61/119,697, filed on Dec. 3, 2008, U.S. Provisional Application No. 61/120,060, filed on Dec. 5, 2008, U.S. Provisional Application No. 61/143,813, filed on Jan. 11, 2009, U.S. Provisional Application No. 61/154,420 filed on Feb. 22, 2009, U.S. Provisional Application No. 61/159,058 filed on Mar. 10, 2009, Korean Application No. 10-2009-0094486 filed on Oct. 6, 2009, all of which are hereby incorporated by reference.

BACKGROUND OF THE INVENTION

1. Field of the Invention

The present invention relates to an apparatus for processing a video signal and method thereof, for which inter picture prediction is used.

2. Discussion of the Related Art

Generally, in transmitting an encoded video signal to a decoder, a method of removing spatial redundancy and temporal redundancy, i.e., intra or inter picture prediction is performed to enhance a compression ratio of the video signal.

SUMMARY OF THE INVENTION

Accordingly, the present invention is directed to an apparatus for processing a video signal and method thereof that substantially obviate one or more of the problems due to limitations and disadvantages of the related art.

An object of the present invention is to provide an apparatus for processing a video signal and method thereof, by which a video signal can be efficiently processed using inter picture prediction.

Another object of the present invention is to provide an apparatus for processing a video signal and method thereof, by which a video signal can be efficiently processed in a manner of performing inter picture prediction using a skip mode.

A further object of the present invention is to provide an apparatus for processing a video signal and method thereof, by which a video signal can be efficiently processed using a direct mode.

To achieve these and other advantages, the present invention proposes a video signal processing method characterized in configuring various motion vector candidates in performing inter picture prediction and obtaining a precise motion vector from the various motion vector candidates.

The present invention proposes a video signal processing method characterized in indicating whether a region having a predetermined size within a macroblock is coded in a skip mode.

The present invention proposes a video signal processing method characterized in indicating whether a partition of a macroblock according to macroblock type information is coded in a skip mode.

The present invention proposes a video signal processing method characterized in proposing a macroblock type for indicating a skip mode or a direct mode in part within one macroblock and performing inter picture prediction using the skip mode or the direct mode based on the macroblock type.

The present invention proposes a video signal processing method characterized in deriving a motion vector by a block unit smaller than a size of a macroblock if the macroblock is coded in a skip mode.

And, the present invention proposes a video signal processing method characterized in defining skip mode indication information or direct mode indication information, indicating whether a macroblock is coded in a skip mode, and determining whether it is a skip mode or a direct mode using CBP (coded block pattern) information.

Accordingly, the present invention provides the following effects and/or advantages.

First of all, a precise motion vector is obtained from motion vector candidates for inter picture prediction. Hence, a bit size of a motion vector difference value to be coded can be reduced and accuracy in reconstructing an original video can be enhanced. In case that a skip mode or a direct mode is used for a macroblock greater than 16×16, by means of using a skip mode or a direct mode by a block unit smaller than a size of the macroblock, error of inter picture prediction using a skip mode or a direct mode can be reduced and coding efficiency can be enhanced. By means of using a macroblock type for indicating a skip mode or a direct mode within one macroblock partially, it is not necessary to code information indicating a skip mode or a direct mode for a predetermined-size region within the macroblock and it is also able to reduce a bit size to be coded by coding the macroblock type information only. In case of coding a macroblock in a skip mode, by a motion vector is derived by a block unit smaller than a size of the macroblock, it is able to obtain a pixel value of a reference block close to an original video using the motion vector. Accordingly, it is able to improve a reconstruction ratio of a macroblock. As a macroblock uses a skip mode or a direct mode, it is not necessary to separately code skip mode indication information and direct mode indication information separately for a macroblock. Since a skip mode or a direct mode is determined using already-coded CBP information, it is able to reduce an information size to be coded. Therefore, efficiency of video signal processing can be enhanced.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 4 is a diagram for a method of indicating whether a current macroblock is partially coded in a skip mode at a sub-macroblock level according to one embodiment of the present invention;

FIG. 6 and FIG. 7 are diagrams of a macroblock type for indicating a partial skip mode according to one embodiment of the present invention;

DETAILED DESCRIPTION OF THE INVENTION

Figure 1:
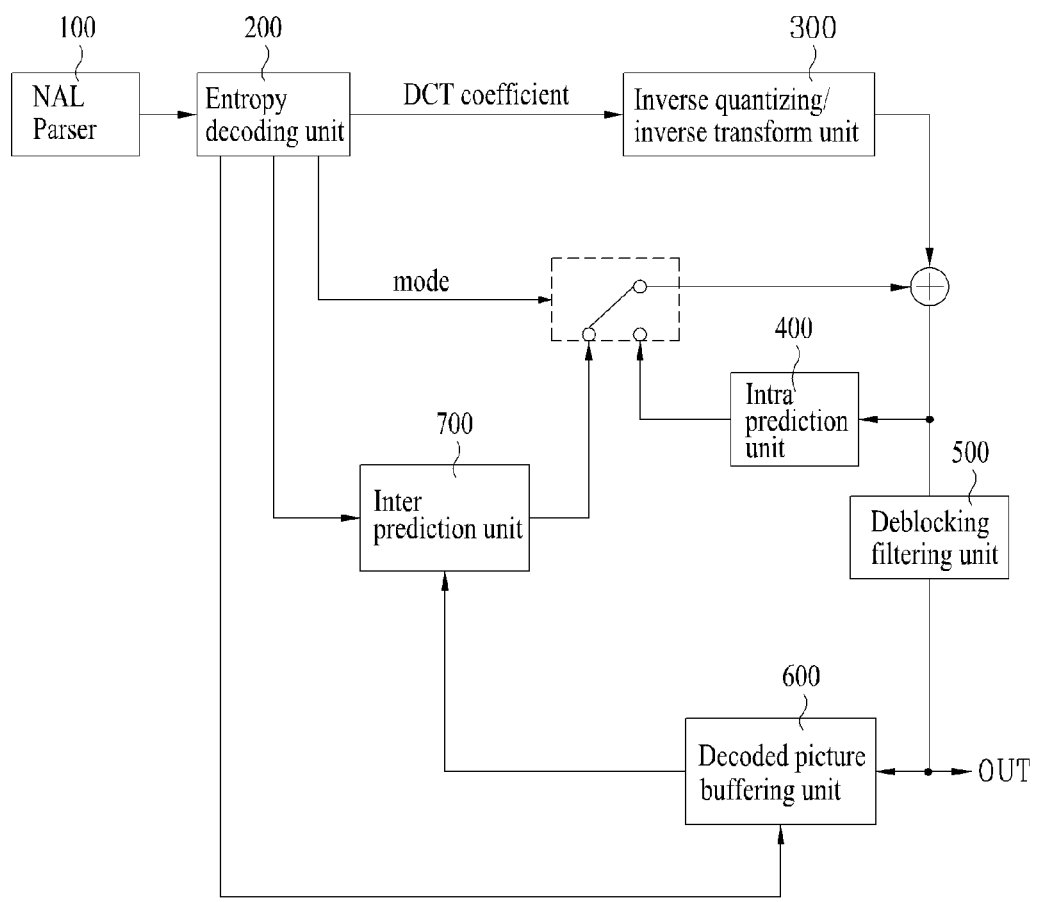
FIG. 1 is a schematic block diagram of a video signal decoding apparatus according to the present invention.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of processing a video signal includes the steps of obtaining current macroblock type, obtaining skip or direct mode indication information on a partition of the current macroblock according to the current macroblock type, deriving a motion vector of the partition according to the skip or direct mode indication information, and predicting a pixel value of the partition using the motion vector.

Preferably, the present invention is characterized in that the skip or direct mode indication information includes information indicating whether the partition is coded in a skip mode or a direct mode.

Preferably, the present invention is characterized in that the step of deriving the motion vector of the partition further includes the steps of obtaining CBP (coded block pattern) information of the current macroblock and determining whether the partition is coded in a skip mode or a direct mode based on the CBP information.

More preferably, the present invention is characterized in that the method further includes the step of if the partition is coded in the direct mode, obtaining residual data of the partition.

In this case, the present invention is characterized in that the residual data of the partition means a difference value between an original pixel value of the partition and the predicted pixel value.

Preferably, the present invention is characterized in that the motion vector of the partition is derived from an medium value of a motion vector of a block neighbor to the partition.

More preferably, the present invention is characterized in that the block neighbor to the partition includes left, top and right top blocks of the partition.

Preferably, the present invention is characterized in that the pixel value of the partition includes a pixel value of a reference block indicated by the motion vector of the partition.

It is to be understood that both the foregoing general description and the following detailed description are exemplary and explanatory and are intended to provide further explanation of the invention as claimed.

Reference will now be made in detail to the preferred embodiments of the present invention, examples of which are illustrated in the accompanying drawings. First of all, terminologies or words used in this specification and claims are not construed as limited to the general or dictionary meanings and should be construed as the meanings and concepts matching the technical idea of the present invention based on the principle that an inventor is able to appropriately define the concepts of the terminologies to describe the inventor's invention in best way. The embodiment disclosed in this disclosure and configurations shown in the accompanying drawings are just one preferred embodiment and do not represent all technical idea of the present invention. Therefore, it is understood that the present invention covers the modifications and variations of this invention provided they come within the scope of the appended claims and their equivalents at the timing point of filing this application.

First of all, a macroblock is a basic unit for processing a video frame and can be defined as a region constructed with 16×16 pixels. A macroblock greater than 16×16 can becomes a basic unit for processing a video frame having resolution higher than that of the related art. For instance, this macroblock can be defined as a region constructed with 32×32 pixels or 64×64 pixels for examples.

A macroblock greater than 16×16 can be adaptively used according to resolution of a video image. For instance, if resolution of a video image is equal to or smaller than VGA, it is able to set a size of a macroblock to 16×16. Accordingly, one of 16×8, 8×16, 4×8, 8×4 and 4×4 blocks is usable as a partition of a macroblock. If resolution of a video image is equal to or greater than VGA and equal to or smaller than 1080P, it is able to set a size of a macroblock to 32×32. Accordingly, one of 32×16, 16×32, 16×16, 16×8, 8×16 and 8×8 blocks is usable as a partition of a macroblock. If resolution of a video image is equal to or greater than 1080P and equal to or smaller than 4k×2k, it is able to set a size of a macroblock to 64×64. Likewise, one of 64×32, 32×64, 32×32, 32×16, 16×32 and 16×16 blocks is usable as a partition of a macroblock. Yet, an encoder is able to determine an optimal size of one of a 16×16 macroblock and other macroblocks greater than 16×16 according to resolution of a video image. The determined macroblock size information can be transmitted to a decoder at a slice or sequence level.

A macroblock type can be defined according to a prediction mode of a macroblock, i.e., according to an intra picture prediction mode or an inter picture prediction mode. This can include size information of a predicted block. And, a macroblock type for performing inter picture prediction can include information on a prediction direction as well.

A size of a predicted block coded in an intra picture prediction mode can be set to one of 16×16 pixels, 8×8 pixels and 4×4 pixels. The predicted block can means a unit of a block for performing intra picture prediction or inter picture prediction within a picture. For the motion compensation of a predicted block coded in the inter picture prediction mode, one of 16×16 pixels, 16×8 pixels, 8×16 pixels and 8×8 pixels is usable as a size of the predicted block. In case that 8×8 pixels are used as a size of a predicted block, it is able to perform inter picture prediction by a unit of partition (e.g., 8×4 pixels, 4×8 pixels and 4×4 pixels) of the 8×8 pixels predicted block.

In case that resolution is equal to or greater than VGA and equal to or smaller than 1080P, a size of a predicted block coded in an intra picture prediction mode can be set to 16×16 pixels or 8×8 pixels. And, a size of a predicted block coded in an inter picture prediction mode can be set to one of 16×16 pixels, 16×8 pixels, 8×16 pixels and 8×8 pixels. In this case, inter picture prediction may not be performed by a unit of a partition (e.g., 8×4 pixels, 4×8 pixels and 4×4 pixels) of an 8×8 pixels predicted block. In case that resolution is equal to or greater than 1080P and equal to or smaller than 4k×2k, a size of a predicted block coded in an intra picture prediction mode or an inter picture prediction mode can be set to 16×16 pixels.

Likewise, an encoder is able to determine an optimal macroblock type according to resolution of a video image. This determined macroblock type information can be sent to a decoder at a slice level or a sequence level. Accordingly, it is able to adaptively use the determined macroblock type.

FIG. 1 is a schematic block diagram of a video signal decoding apparatus according to the present invention.

Referring to FIG. 1, the decoding apparatus mainly includes a parsing unit 100, an entropy decoding unit 200, a inverse quantizing/inverse transform unit 300, an intra prediction unit 400, a deblocking filtering unit 500, a decoded picture buffering unit 600, an inter prediction unit 700 and the like.

The parsing unit 100 performs parsing by NAL unit to decode a received video image. Generally, at least one or more sequence parameter sets and picture parameter sets are sent to a decoder before a slice header and data are decoded. In this case, various kinds of attribute informations can be included in a NAL header region or an extension region of a NAL header. A parsed bitstream is entropy-decoded via the entropy decoding unit 200 and a coefficient of each macroblock, a motion vector and the like are then extracted. The inverse quantizing/inverse transform unit 300 obtains a coefficient value by multiplying a received quantized value by a predetermined constant and then reconstructs a pixel value by inverse-transforming the coefficient value. The intra prediction unit 400 performs intra picture prediction from a decoded sample within a current picture using the reconstructed pixel value. Meanwhile, the deblocking filtering unit 500 is applied to each coded macroblock to reduce block distortion. A filter enhances an image quality of a frame by smoothing edges of a block. Selection for a filtering process depends on a variation of an image sample. Filtered pictures are outputted or stored in the decoded picture buffer unit 600 to be used as a reference picture. The decoded picture buffer unit 600 plays a role in storing or opening previously coded pictures to perform inter picture prediction. In this case, in order to store or open them, frame_num of each picture and POC (picture order count) are used. The inter prediction unit 700 performs inter picture prediction using the reference pictures stored in the decoded picture buffer unit 600. A macroblock coded in an inter mode can be divided into macroblock partitions. And, each of the macroblock partitions can be predicted from one or two reference pictures. The inter prediction unit 700 compensates for a motion of a current block using informations transmitted from the entropy decoding unit 200. In the following description, it is understood that a block includes a macroblock or a partition of a macroblock. Motion vectors of blocks neighbor to a current block are extracted from a video signal. It is then able to obtain a motion vector predicted value of the current block from the neighbor block. The neighbor block can include a block at a left, top or right top side of the current block. For instance, it is able to set a predicted value of a motion vector of a current block to be obtained using medium values of horizontal and vertical components of motion vectors of neighbor blocks. Alternatively, in case that a left block of a current block has at least one predicted block coded in an inter picture prediction mode, it is able to set a predicted value of a motion vector of a current block to be obtained using a motion vector of a predicted block located at a top side. In case that a top side block of a current block has at least one predicted block coded in an inter picture prediction mode, it is able to set a predicted value of a motion vector of the current block to be obtained using a motion vector of a predicted block located at a most left side. In case that blocks located at top and right sides of a current block among neighbor blocks are located outside a boundary of a picture or slice, it is able to set a predicted value of a motion vector of the current block to a motion vector of a left block. If there exists one block having the same reference picture index of a current block among neighbor blocks, it is able to set a motion vector of the corresponding block to be used for prediction.

Based on a partition of a macroblock according to a macroblock type, it is able to obtain a predicted value of a motion vector. For instance, when a partition of the current macroblock according to a current macroblock type is 8×16, if an index of the partition of the macroblock is set to 0, it is able to set a top side block of a current block to be used for prediction. If an index of the partition of the macroblock is set to 1, it is able to set a left side block of a current block to be used for prediction.

In obtaining a motion vector predicted value of a current block, it is able to define various kinds of motion vectors extractable from neighbor blocks as candidates for a motion vector predicted value. As mentioned in the foregoing description, the candidates for the motion vector predicted value can include a motion vector of one of neighbor blocks, a medium value of motion vectors of neighbor blocks and the like, by which the candidates are non-limited. Accordingly, an encoder selects a motion vector having best efficiency as a motion vector predicted value from the candidates for the motion vector predicted value and is then able to send the selected motion vector information to a decoder. The selected motion vector information can be obtained from a slice level of a macroblock level. It is able to define the candidate of the motion vector predicted value using an index. And, the selected motion vector information can include this index.

By coding a difference vector between a motion vector of a current block and a predicted value of a motion vector, it is able to reduce a size of bits to be coded. Using the obtained motion vector predicted value and the difference vector extracted from a video signal, the motion of the current block is compensated. Moreover, this motion compensation can be performed using one reference picture or a plurality of pictures.

In case that a size of a macroblock is 16×16, total 7 kinds of block sizes including 16×16, 16×8, 8×16, 8×8, 8×4, 4×8, and 4×4 are available for inter picture prediction. They can be hierarchically represented as macroblock or sub-macroblock types. In particular, a size of a predicted block can be represented as a macroblock type and one of 16×16, 16×8, 8×16 and 8×8 can be selected.

A reference picture index and a motion vector can be coded for each predicted block. Alternatively, a motion vector can be coded for each predicted block. Of course, a coding scheme for a sub-macroblock can be determined in the same manner of a macroblock.

In reconstructing a current macroblock, a skip macroblock can be defined as using a pixel value of a macroblock intactly within a previously coded reference picture instead of having information on the current macroblock, i.e., a motion vector, a reference picture index and a residual data. In coding a skip macroblock, a motion compensation using a motion vector can be accompanied. This motion vector can be derived using a neighbor block. The former motion vector deriving method is identically applicable to a method of deriving the motion vector.

A process for coding slice data using a skip mode is explained as follows.

First of all, it is able to obtain flag information indicating whether a current macroblock within a slice is a skip macroblock.

In case of a macroblock greater than 16×16, it is able to apply a skip mode by a block unit smaller than a size of the macroblock by indicating a partition of the macroblock that uses a skip mode. Hence, it is able to enhance efficiency of coding.

Figure 2:
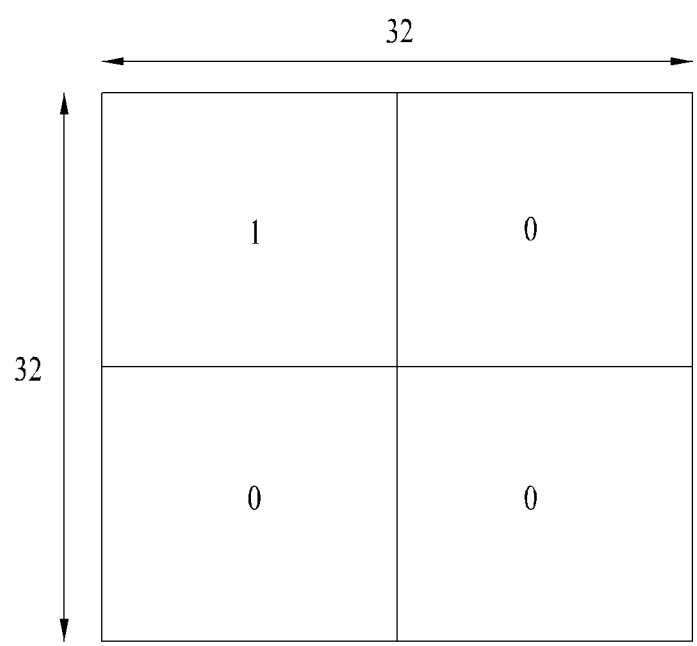
FIG. 2 is a diagram for a method of applying a skip mode by a block unit smaller than a size of a macroblock according to one embodiment of the present invention.

FIG. 2 is a diagram for a method of applying a skip mode by a block unit smaller than a size of a macroblock according to one embodiment of the present invention.

Referring to FIG. 2, in case that a size of a macroblock is 32×32, it is able to use flag information indicating whether it is a skip macroblock by 16×16 block unit. If a flag indicating whether it is the skip macroblock is set to 1, it is able to define the macroblock is in a skip mode. In case that a partition of a macroblock located at a left top side within a macroblock is coded in a skip mode only, four bits '1000' can be transmitted. If all partitions of 16×16 macroblock within a macroblock are coded in a skip mode, other information such as a motion vector and the like is not parsed. Yet, if the macroblock partially includes the partition of the macroblock coded in the skip mode, a macroblock type will be parsed. In this case, it can be represented as a macroblock type having a partition of 16×16 macroblock.

Figure 3:
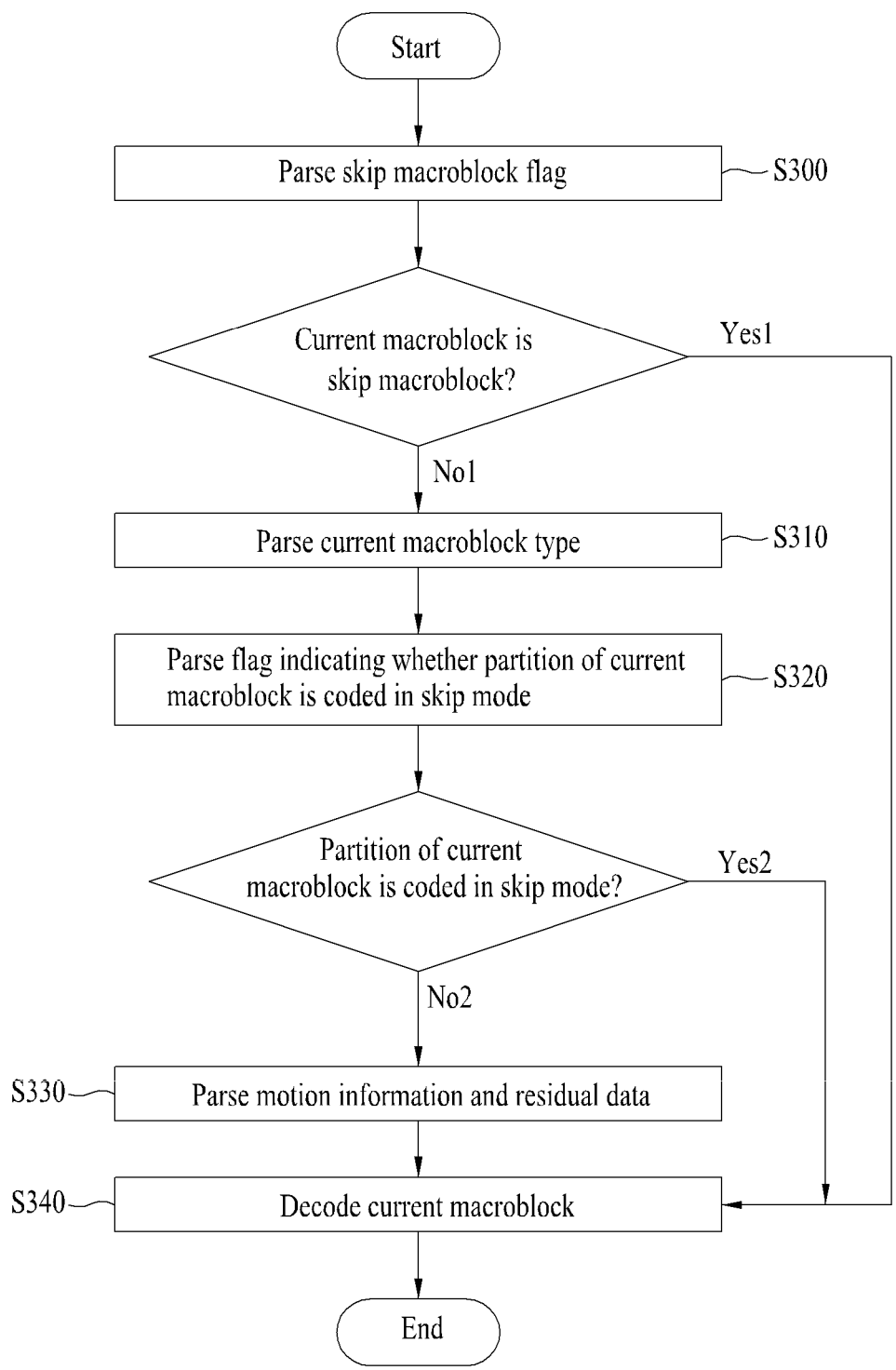
FIG. 3 is a block diagram for a method of indicating a portion that uses a skip mode within a macroblock based on macroblock type information.

FIG. 3 is a block diagram for a method of indicating a portion that uses a skip mode within a macroblock based on macroblock type information.

Referring to FIG. 3, flag information indicating whether a current block is a skip macroblock at a slice level is parsed [S300]. As a result of the parsing, if the current macroblock is not the skip macroblock ['no 1'], current macroblock type information will be parsed at a macroblock level [S310]. If the current macroblock is not the skip macroblock, some of partitions of the current macroblock may be coded in a skip mode. Hence, if the current macroblock is the skip macroblock ['yes 1'], it is able to perform decoding without parsing motion information of the current macroblock and the like [S340]. If the current macroblock is not the skip macroblock, a current macroblock type is parsed and partition information of the current macroblock can be then obtained from the current macroblock type. It is able to parse flag information indicating whether a partition of the current macroblock is coded in a skip mode [S320]. When a size of a current macroblock is 32×32, as a result of parsing a current macroblock type at a macroblock level, if the current macroblock type is represented as 16×16, it is able to parse flag information indicating whether partitions of the 16×16 macroblock are coded in skip mode. According to the flag information, decoding will be performed on the skip mode coded partition ['yes 2'] without parsing motion information and the like. And, motion information and residual data will b parsed for the partition ['no 2'] that is not coded in the skip mode [S330]. This can be identically applied to a sub-macroblock level.

FIG. 4 is a diagram for a method of indicating whether a current macroblock is partially coded in a skip mode at a sub-macroblock level according to one embodiment of the present invention. Referring to FIG. 4, if a size of a current macroblock is 32×32, it is able to set a size of a sub-macroblock to 16×16. As a result of parsing current macroblock type information, if a partition of a macroblock according to a current macroblock type is 16×16, it is able to parse flag information indicating whether four 16×16 sub-macroblocks are coded in skip mode [S400]. As a result of this parsing, it is able to perform decoding on a skip-mode coded sub-macroblock without parsing separate information [S410]. Hence, it is able to parse a motion vector and reference picture index of this sub-macroblock [S420]. Yet, the motion vector of the sub-macroblock can be parsed based on a partition off the sub-macroblock according to a sub-macroblock type.

Figure 5:
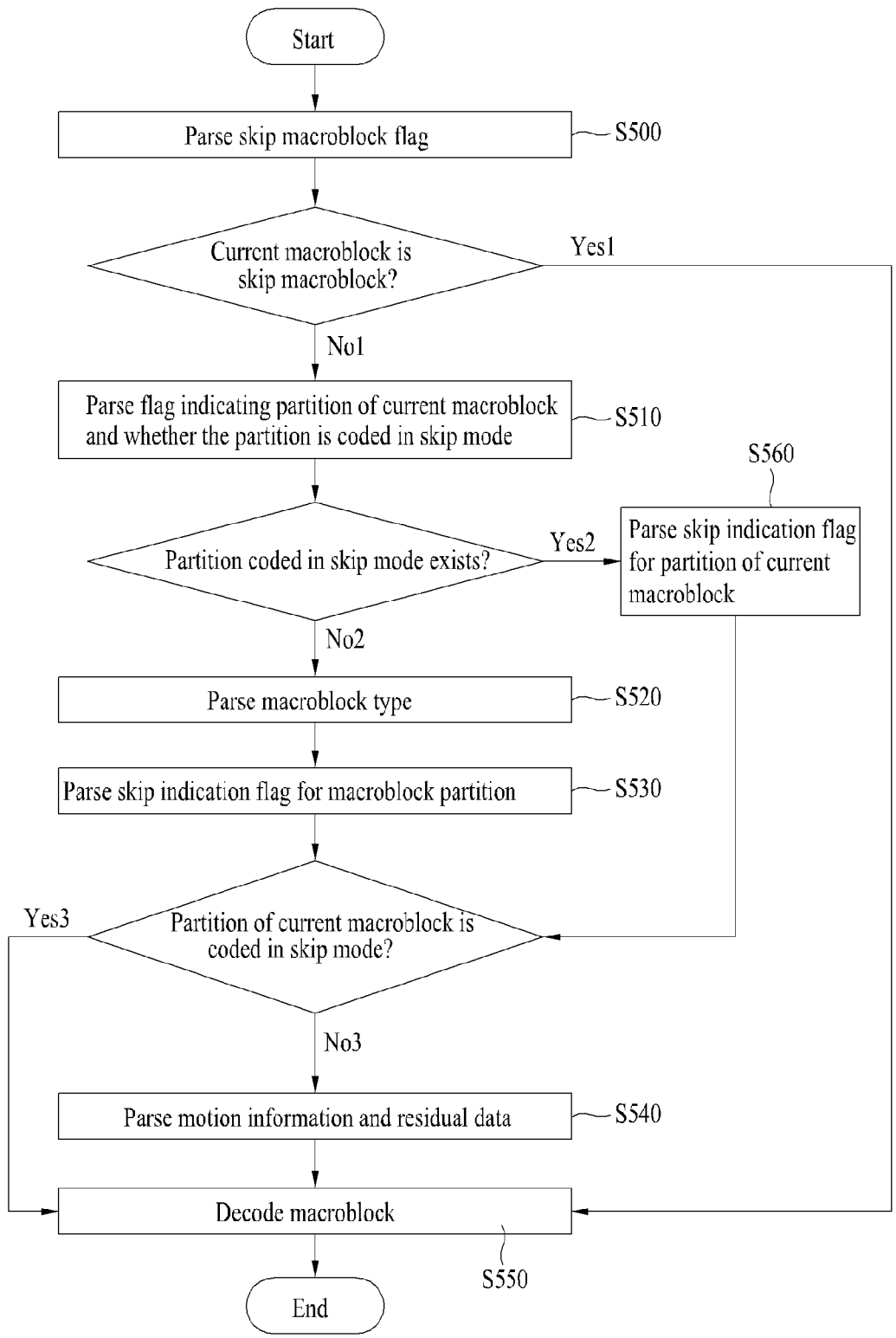
FIG. 5 is a diagram for a method of indicating whether a current macroblock is partially coded in a skip mode according to another embodiment of the present invention.

FIG. 5 is a diagram for a method of indicating whether a current macroblock is partially coded in a skip mode according to another embodiment of the present invention.

Referring to FIG. 5, it is able to parse flag information indicating whether a current macroblock within a slice is a skip macroblock [S500]. If the current macroblock is the skip macroblock according to the flag information ['yes 1'], it is able to perform decoding without parsing motion information and the like [S550]. Yet, if the current macroblock is not the skip macroblock ['no 1'], it is able to parse flag information indicating a presence or non-presence of a partition of the current macroblock and a presence or non-presence of skip mode coding of the partition [S510].

For instance, in case that a size of a macroblock is 32×32, if the flag is set to 1, it is able to define that the partition of the macroblock is 16×16. And, it is also able to define that at least one of partitions of the macroblock is coded in a skip mode. On the contrary, if the flag is set to 0, it is able to define that the partition of the macroblock is not 16×16 or define that all partitions of the macroblock are not coded in the skip mode despite 16×16.

In the following description, assume that the flag is defined in the above manner. Hence, as a result of parsing the flag information, if '1' is obtained ['yes 2'], as a partition of the macroblock is set to 16×16, it is not necessary to parse the macroblock type information. And, it is able to parse flag information indicating whether the partition of the 16×16 macroblock is coded in the skip mode for four 16×16 macroblock partitions [S560]. Hence, if the partition of the 16×16 macroblock is coded in the skip mode ['yes 3'], it is able to perform decoding without parsing motion information and the like [S550]. Moreover, if the partition is coded in the skip mode, CBP information may not b parsed. Accordingly, by reducing a size of transmitted information, it is able to enhance efficiency of signal processing. Yet, if not coded in the skip mode ['no 3'], motion information and residual are parsed [S540] and it is able to decode using the parsing result [S550].

As a result of parsing the flag information, if 0 is obtained ['no 2'], it is able to parse the current macroblock type information [S520]. If a partition of the current macroblock according to a current macroblock type is not 16×16, it is able to parse flag information indicating whether it is coded in a skip mode [S530]. Yet, if a partition of the current macroblock according to a current macroblock type is 16×16, as all four partitions are not coded in the skip mode, the flag information indicating whether the partition is coded in the skip mode may not be parsed. And, it is able to set the information indicating whether the partition is coded in the skip mode to be derived into 0.

If the partition is coded in the skip mode according to the flag information indicating whether each of the obtained partitions of the macroblock is coded in the skip mode ['yes 3'], it is able to perform decoding without parsing motion information and the like. If the partition is not coded in the skip mode ['no 3'], it is able to perform decoding by parsing motion information and residual [S540] [S550].

Figure 6:
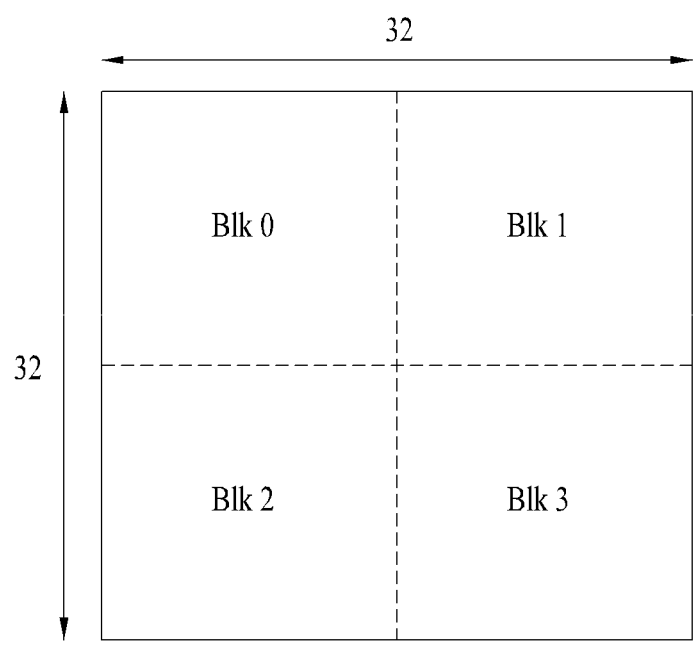

In another way, it is able to newly define a macroblock type for a skip mode indication. FIG. 6 and FIG. 7 are diagrams of a macroblock type for indicating a partial skip mode according to one embodiment of the present invention.

In case that a size of a macroblock is greater than 16×16, it is able to define a macroblock type that indicates whether a skip mode is used by a partition unit of the macroblock.

With reference to FIG. 6, explained in the following description is a case that a skip mode is used by a partition unit of a macroblock on the assumption that a size of a macroblock is 32×32. As mentioned in the foregoing description, in case that all partitions of the 16×16 macroblock within a current macroblock are coded in the skip mode, it is able to obtain flag information indicating that a current macroblock is a skip macroblock at a slice level. On the contrary, in case that all partitions of the 16×16 macroblock are not coded in the skip mode, flag information indicating that a current macroblock is not a skip macroblock and the current macroblock type can be then parsed. In this case, if some of the partitions of the 16×16 macroblock are coded in the skip mode in part, a current macroblock type can be represented as a macroblock type proposed in FIG. 7. In particular, partitions (partition indexes 0 and 2 of a macroblock) of the 16×16 macroblock are coded in the skip mode and partitions (partition indexes 1 and 3 of a macroblock) of the 16×16 macroblock are not coded in the skip mode, a current macroblock type will become 5 [S600]. In this case, the partitions (partition indexes 0 and 2 of a macroblock) of the 16×16 macroblock can be decoded without parsing other information such as motion information and the like. Yet, motion information, reference picture indexes and the like will be parsed for the partitions (partition indexes 1 and 3 of a macroblock) of the 16×16 macroblock. Each of the partitions (partition indexes 0 and 2 of a macroblock) of the 16×16 macroblock can be set to a size of 16×32 predicted block or a size of 16×16 predicted block.

A method of deriving a motion vector of a skip macroblock is explained as follows. And, a motion vector of a sub-macroblock can be derived in the same manner.

First of all, if a current block is a skip macroblock, it is able to derive a motion vector using a neighbor block of the current block.

For instance, assume that a block at a left side of a current block, a block at a top side and a block at a right top side are named a neighbor block A, a neighbor block B and a neighbor block C, respectively. And, assume that their motion vectors are set to mvA, mvB and mvC, respectively. A motion vector of the current block can be derived into medium values of horizontal and vertical components of the mvA, mvB and mvC or an average value of the mvA, mvB and mvC. It can be derived into one of three motion vectors and this can be determined based on a reference picture index. Moreover, in case of a macroblock greater than 16×16, it is ale to obtain a precise motion vector of a macroblock by deriving a motion vector by a block unit smaller than a size of the macroblock or the sub-macroblock.

Figure 8:
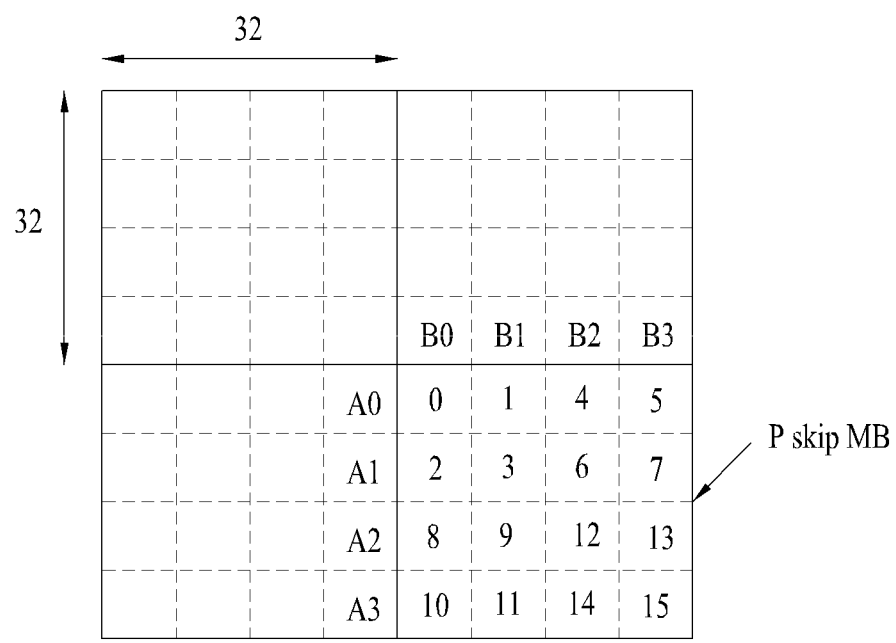
FIG. 8 is a diagram for a method of deriving a motion vector in case that a macroblock type is a P skip macroblock according to one embodiment of the present invention.

FIG. 8 is a diagram for a method of deriving a motion vector in case that a macroblock type is a P skip macroblock according to one embodiment of the present invention.

Referring to FIG. 8, in case that a size of a macroblock is 32×32, it is able to derive a motion vector by a block unit smaller than a size of the macroblock, i.e., by 8×8 block unit. In particular, a motion vector of a block 0 can be derived into an medium value of horizontal and vertical components of mvA0, mvB0 and mvC0, an average value of mvA0, mvB0 and mvB1, or one motion vector among mvA0, mvB0 and mvB1. Likewise, a motion vector of a block 1 can be derived into a medium value of horizontal and vertical component of mvB0, mvB1 and mvB2. Index of the block may mean a decoding order.

Inter picture prediction using a direct mode is explained as follows. First of all, a direct mode indicates a mode for predicting motion information of a current block from motion information of a reconstructed block. The motion information may include a motion vector and a reference picture index. For instance, it is able to define a picture having a smallest reference index among List1 reference pictures as an anchor picture in a direct mode. And, a block of the anchor picture co-located at the same spatial position of the current block can be defined as an anchor block.

For instance, in a temporal prediction mode, it is able to predict motion information of a current block using motion information of the anchor block. It is able to define a motion vector in a List0 direction of the anchor block as mvCol. In this case, if a motion vector in the List0 direction of the anchor block does not exist but a motion vector in List1 direction exists, it is able set a motion vector in the List1 direction to mvCol. In this case, in case of a picture B, it is able to two random pictures can be used as reference pictures irrespective of temporal or spatial sequence. In doing so, the used prediction is named List0 prediction or List1 prediction. For instance, the List0 prediction means prediction for a forward direction, while the List1 prediction means prediction for a backward direction.

In a temporal direct mode, List0 reference picture of a current block becomes a picture referred to by the mvCol and List1 reference picture becomes an anchor picture. If the anchor block does not have motion information, a motion vector becomes 0 and a reference picture index of the List0 reference picture in the temporal direct mode becomes 0.

Moreover, it is able to find a motion vector mvL0 of List0 and a motion vector mvL1 of List1 from the motion vector mvCol. Assuming that a speed of motion within a reference picture, a current picture and an anchor picture is constant, a size of each of the mvL0 and the mvL1 becomes proportional to time intervals among the reference, current and anchor pictures. Hence, using the interval between the reference picture and the current picture and the interval between the reference picture and the anchor picture, it is able to find the mvL0 and the mvL1. In particular, in case that List0 reference index of the anchor block refers to a long-term reference picture, it can be found by Formula 1.

$$mvL0 = mvCol$$

$$mvL1 = 0 \qquad \text{[Formula 1]}$$

In case that List0 reference index of the anchor block does not refers t a long-term reference picture, it can be found by Formula 2.

$$mvL0 = mvCol*(tb/td)$$

$$mvL1 = -mvCol*(td-tb)/td = mvL0 - mvCol \qquad \text{[Formula 2]}$$

For another example of the direct mode, a spatial direct mode predicts motion information of a current block using motion information correlation of a spatial direction. Like the temporal direct mode, an anchor picture and an anchor block are used in finding motion information.

Figure 9:
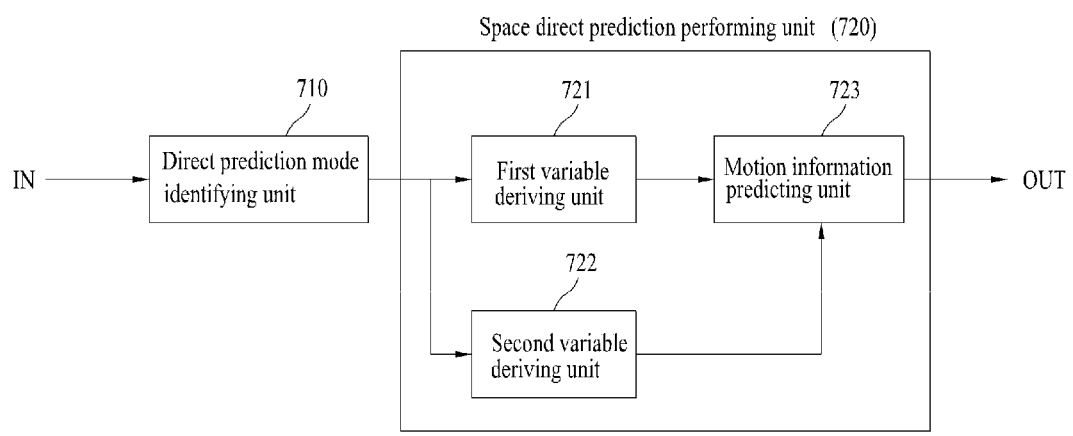
FIG. 9 is a schematic internal block diagram of an inter prediction unit 700 having a spatial direction prediction mode applied thereto.

FIG. 9 is a schematic internal block diagram of an inter prediction unit 700 having a spatial direction prediction mode applied thereto.

Referring to FIG. 9, an inter prediction unit 700 mainly includes a direct mode identifying unit 710, a spatial direct prediction performing unit 720, etc. And, the spatial direct prediction performing unit 720 includes a first variable deriving unit 721, a second variable deriving unit 722 and a motion information predicting unit 723.

The direct mode identifying unit 710 identifies a prediction mode of a current slice. For instance, if a slice type of a current slice is P slice or B slice, a direct mode is usable. In this case, it is able to use a direct mode flag indicating whether a temporal direct mode or a spatial direct mode in a direct mode will be used. The direct mode flag can be obtained from a slice header. In case that the spatial direct mode is applied according to the direct mode flag, it is able to preferentially obtain motion information of blocks neighbor to a current block. For instance, assuming that a block at a left side of a current block, a block at a top side and a block at a right top side are named a neighbor block A, a neighbor block B and a neighbor block C, respectively, it is able to obtain motion information of the neighbor blocks A, B and C. The first variable deriving unit 721 is able to derive a reference picture index for List0 or List1 direction of the current block using the motion information of the neighbor blocks. And, it is then able to derive a first variable based on the reference picture index of the current block. In this case, the first variable can mean a variable (directZeroPredictionFlag) used in predicting a motion vector of the current block as a random value. For instance, a reference picture index for the List0 or List1 direction of the current block can be derived into a smallest value of reference picture indexes of the neighbor blocks. For this, the following formula (Formula 3) is usable.

refIdxL0=MinPositive(refIdxL0*A*,MinPositive
   (refIdxL0*B*,refIdxL0*C*))

refIdxL1=MinPositive(refIdxL1*A*,MinPositive
   (refIdxL1*B*,refIdxL1*C*))       [Formula 3]

where, MinPositive(x,y)=Min(x,y) (x≥0 and y≥0) Max(x, y) (other cases)

For example, in detail, it becomes 'MinPositive(0,1)=0'. In particular, in case that two valid indexes exist, it is able to obtain a smaller value. Alternatively, it becomes 'MinPositive (−1,0)=0'. Namely, in case that one valid index exists, it is able to obtain a large value that is a valid index value. Alternatively, it becomes 'MinPositive(−1,−1)=−1'. Namely, in case that two are not valid index at all, e.g., if both neighbor blocks are blocks coded in an intra picture prediction mode or two neighbor blocks are not available, a large value '−1' is obtained. Therefore, in order to obtain an invalid result value, at least one valid value should not exist.

First of all, for an initial value of the first variable, it is able to set the first variable to 0. Moreover, in case that each reference picture index for the derived List 0 and List1 directions is smaller than 0, a reference picture index for the List0 or List1 direction of the current block can be set to 0. And, the first variable can be set to a value for indicating that a reference picture of the current block does not exist. In this case, the case that each reference picture index for the derived List0 and List1 directions is smaller than 0 means a case that the neighbor block is a block coded in an intra picture prediction mode or a case that the neighbor block is not available, for example. In this case, by setting the first variable to 1, it is able to set a motion vector of the current block to 0.

Since three neighbor blocks are used for the present embodiment, in case that all three neighbor blocks are coded in the intra picture prediction mode or not available, a reference picture index of the current block may have an invalid value of '−1'. Hence, if all reference picture indexes of the current block are not available, the first variable can be set to 1. In particular, if a reference picture to be used by a current block fails to exist, the first variable can be set to 1.

The second variable deriving unit 722 is able to derive a second variable using the motion information of the anchor block within the anchor picture. In this case, the second variable may mean a variable that is used to predict a motion vector of a current block as a random value. For instance, in case that the motion information of the anchor block meets predetermined conditions, it is able to set the second variable to 1. If the second variable is set to 1, it is able to set a motion vector for the List0 or List1 direction of the current block to 0. The predetermined conditions can include the following. First of all, a picture having a smallest reference picture index among reference pictures for the List1 direction should be a short-term reference picture. Secondly, a reference index of a referred picture of the anchor block should be set to 0. Thirdly, each of the horizontal and vertical components of a motion vector of the anchor block should be equal to or smaller than ±1. Thus, if all the predetermined conditions are met, it is determined that it is close to a video having almost no motion. And, the motion vector of the current block is then set to 0.

The motion information predicting unit 723 is able to predict motion information of a current block based on the derived first and second variables. For instance, if the first variable is set to 1, it is able to set the motion vector for the List0 or List1 of the current block to 0. If the second variable is set to 1, it is able to set the motion vector for the List0 or List1 of the current block to 0. In this case, the setting to 0 or 1 is just exemplary. And, it is able to set the first or second variable to another predetermined value to use.

If the predetermined conditions are not met, it is able to derive motion information of a current block from motion information of neighbor blocks within a current picture. For instance, in case of a motion vector, the motion vector deriving method of the skip macroblock is identically applicable. A reference picture index of the current block can be found in a manner of calculating a minimum value among reference picture indexes of the motion vectors located at left, top and right top sides and then setting the minimum value to the reference picture of the current block.

A method of indicating whether a current macroblock is coded in a direct mode is explained as follows. For this, it is understood that the same method is applicable to a sub-macroblock as well.

Figure 10:
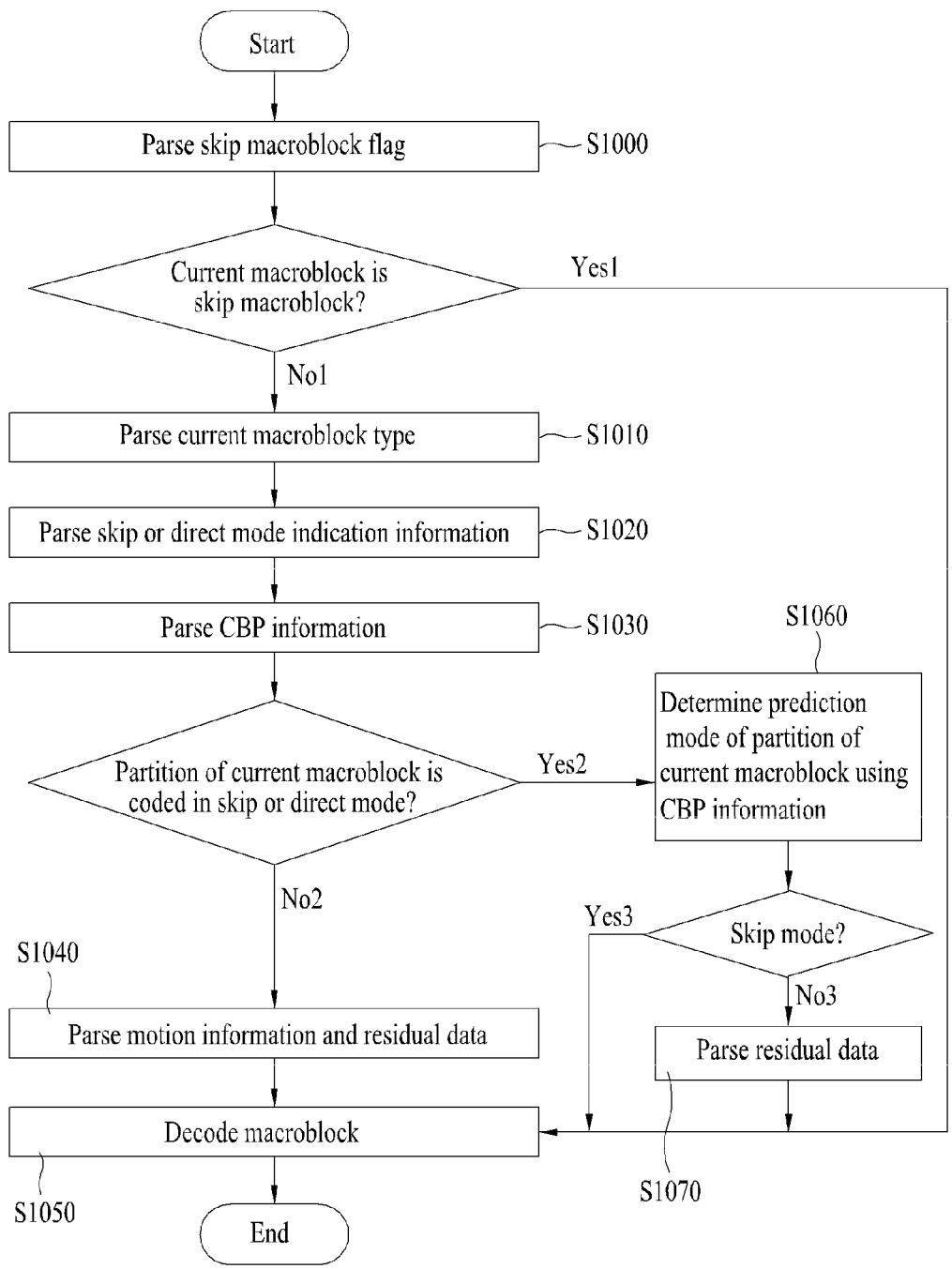
FIG. 10 is a block diagram of a process for decoding slice data using skip or direct mode indication information.

FIG. 10 is a block diagram of a process for decoding slice data using skip or direct mode indication information.

Referring to FIG. 10, it is able to parse flag information indicating whether a current macroblock within a slice is a skip macroblock [S1000]. The flag information can be obtained from a slice layer. As a result of parsing the flag information, if the current macroblock is the skip macroblock ['yes 1'], it is able to perform decoding without parsing motion information and residual data [S1050]. Yet, if the current macroblock is not the skip macroblock ['no 1'], it is able to parse a block type of the current macroblock [S1010]. It is able to parse skip or direct mode indication information for each partition of the current macroblock according to the block type of the current macroblock [S1020]. In this case, the skip or direct mode indication information may mean the information indicating whether the partition of the macroblock is coded in the skip mode or the direct mode. The following description is made on the assumption that a size of a current macroblock is 32×32. First of all, as a result of parsing current macroblock type information, if the current macroblock is coded in an inter picture prediction mode and a partition of the current macroblock is 16×32, 2 bits will be used as skip or direct mode indication information. If a partition index 0 of a macroblock is coded in skip or direct mode but a partition index 1 of the macroblock is not coded in the skip or direct mode, it is able to obtain '10' as skip or direct mode indication information. After the skip or direct mode indication information has been parsed, it is able to parse CBP coded block pattern) information [S1030]. In this case, the CBP information can mean the information indicating whether a current block includes residual data. Therefore, by parsing the CBP information, it is able to know whether the partition of the current block is coded in the skip mode or the direct mode. For instance, as a result of parsing the CBP information on the partition of the current macroblock, if '1' is obtained, it is able to regard that the partition is coded in the direct mode. Based on the skip or direct mode indication information, it is determined whether each partition of the current macroblock is coded in the skip or direct mode. In case that the partition is not coded in the skip mode or the direct mode ['no 2'], it is able to perform decoding by parsing motion information and residual data [S1040] [S1050]. Yet, in case of the partition coded in the skip mode or the direct mode ['yes 2'], whether the partition is coded in the skip mode or the direct mode will be determined based on the parsed CBP information [S1060]. Hence, in case of coding in the skip mode ['yes 3'], it is able to perform decoding without parsing the motion information and the like [S1040]. In case of coding in the direct mode ['no 3'], after the residual data has been parsed [S1070], it is able to perform decoding using the residual data [S1050]. In case of coding in the direct mode, it is able to derive a motion vector in the same manner of the case of coding in the skip mode. It is able to use the direct mode if a slice type is a P slice as well as a B slice.

If the slice type is the B slice, macroblock type information can include size information of a predicted block, prediction direction information and the like. Yet, if it is indicated that a partition of a current macroblock is coded in a skip or direct mode according to the skip or direct mode indication information, a motion vector of the partition is derived. Hence, the prediction direction information of the partition can be derived. In this case, it is able to regard that the macroblock type information includes unnecessary prediction direction information. Hence, by newly defining a macroblock type, it is intended to efficiently perform decoding of the slice data using the above-mentioned skip or direct mode indication information. For instance, it is able to set a macroblock type for a B slice to one of B_direct_32×32, B_32×32, B_32×16, B_16×32 and B_16×16. Yet, in case that a macroblock type is reset, it is determined whether the partition of the current macroblock in FIG. 10 is coded in the skip mode or the direct mode. If it is coded in the skip mode or the direct mode, decoding will be performed in the same process as explained in the foregoing description. If it is not coded in the skip mode or the direct mode, information on a prediction direction of a macroblock will be parsed from a received bitstream as well as motion information and residual data.

Accordingly, the present invention is applicable to video signal encoding/decoding.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of decoding a coded video data bitstream with a decoding apparatus, the method comprising:
   constructing, by the decoding apparatus, a motion vector predictor list of a current block, the motion vector predictor list consisting of two motion vector predictor candidates, each of the motion vector predictor candidates having list index information in the motion vector predictor list, the motion vector predictor candidates including motion vectors of a top neighboring block and a left neighboring block that are adjacent to the current block;
   obtaining, by the decoding apparatus, motion vector predictor index information of the current block from the coded video data bitstream, wherein the motion vector predictor index information specifies a motion vector predictor candidate from among the two motion vector predictor candidates in the motion vector predictor list;
   deriving, by the decoding apparatus, a motion vector predictor from the motion vector predictor list, the motion vector predictor of the current block being the motion vector predictor candidate corresponding to the obtained motion vector predictor index information;
   obtaining, by the decoding apparatus, a motion vector difference of the current block; and
   decoding, by the decoding apparatus, the current block based on the derived motion vector predictor and the motion vector difference.

2. The method of claim 1, wherein the left neighboring block is a block located at a left side of the current block and the top neighboring block is a block located at an upper side of the current block.

3. The method of claim 1, further comprising:
   obtaining, by the decoding apparatus, prediction mode information of the current block from the coded video data bitstream,
   wherein the prediction mode information indicates that the current block is coded in an inter mode.

4. The method of claim 1, wherein decoding the current block based on the derived motion vector predictor and the motion vector difference includes:
   obtaining, by the decoding apparatus, residual samples of the current block from the coded video data bitstream,
   obtaining, by the decoding apparatus, predicted samples of the current block based on the motion vector predictor and the motion vector difference, and
   reconstructing, by the decoding apparatus, the current block using the residual samples and the predicted samples.

5. The method of claim 1, further comprising:
   obtaining, by the decoding apparatus, skip mode indication information of the current block from the coded video data bitstream,
   wherein the skip mode indication information indicates that the current block is not coded in a skip mode.

* * * * *